US011583928B2

United States Patent
Acharya et al.

(10) Patent No.: US 11,583,928 B2
(45) Date of Patent: Feb. 21, 2023

(54) ADDITIVE MANUFACTURING BASED MULTI-LAYER FABRICATION/REPAIR

(71) Applicant: United Technologies Corporation, Farmington, CT (US)

(72) Inventors: Ranadip Acharya, Rocky Hill, CT (US); Vijay Narayan Jagdale, South Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 742 days.

(21) Appl. No.: 16/385,177

(22) Filed: Apr. 16, 2019

(65) Prior Publication Data
US 2020/0331059 A1 Oct. 22, 2020

(51) Int. Cl.
B33Y 50/02 (2015.01)
B22F 10/20 (2021.01)
B29C 64/386 (2017.01)
G06F 30/20 (2020.01)
B22F 5/00 (2006.01)
B22F 5/04 (2006.01)
B33Y 10/00 (2015.01)
B33Y 30/00 (2015.01)
(Continued)

(52) U.S. Cl.
CPC .............. *B22F 10/20* (2021.01); *B22F 5/009* (2013.01); *B22F 5/04* (2013.01); *B29C 64/386* (2017.08); *G06F 30/20* (2020.01); *B33Y 10/00* (2014.12); *B33Y 30/00* (2014.12); *B33Y 50/02* (2014.12); *B33Y 80/00* (2014.12); *G06F 2119/18* (2020.01)

(58) Field of Classification Search
CPC .......... B22F 10/20; B22F 10/30; B22F 5/009; B22F 5/04; B29C 64/386; B33Y 10/00; B33Y 30/00; B33Y 50/00; B33Y 50/02; B33Y 80/00; C11C 2200/00; C30B 11/006; C30B 28/08; C30B 29/52; G06F 2119/18; G06F 30/20; Y02P 10/25
See application file for complete search history.

(56) References Cited

U.S. PATENT DOCUMENTS

2013/0085589 A1* 4/2013 Conrardy ................ G06F 17/00
700/97
2016/0158889 A1 6/2016 Carter et al.
(Continued)

FOREIGN PATENT DOCUMENTS

EP 3441162 A1 2/2019
EP 3459654 A1 3/2019
(Continued)

OTHER PUBLICATIONS

EP Search Report dated Sep. 14, 2020 issued for corresponding European Patent Application No. 20168076.6.
(Continued)

Primary Examiner — Yuhui R Pan
(74) Attorney, Agent, or Firm — Bachman & LaPointe, P.C.

(57) ABSTRACT

A method of additively manufacturing includes generating a thermal model driven scan map that identifies an equiaxed cap region, a single crystal (SX) region, and a columnar to equiaxed transition (CET) region; and forming an active melt pool with respect to the thermal model driven scan map such that a depth of the active melt pool is greater than a thickness of the equiaxed transition (CET) region.

7 Claims, 6 Drawing Sheets

(51) Int. Cl.
    *B33Y 80/00*      (2015.01)
    *G06F 119/18*     (2020.01)

(56) References Cited

U.S. PATENT DOCUMENTS

2017/0182562 A1*  6/2017  Das ................. B33Y 10/00
2017/0304900 A1   10/2017 Strangman
2019/0255613 A1*  8/2019  Schwarze ........... B22F 10/20
2020/0269322 A1   8/2020  Das et al.

FOREIGN PATENT DOCUMENTS

JP    2017048428 A    3/2017
WO    2014074947 A2   5/2014

OTHER PUBLICATIONS

Liu, W., et al.: Effects of Melt-Pool Geometry on Crystal Growth and Microstructure Development in Laser Surface-Melted Superalloy Single Crystals. Mathematical Modeling of Single-Crystal Growth in a Melt Pool (part 1); Acta Materialia, Elsevier, Oxford, GB, vol. 52, No. 16, Sep. 20, 2004, pp. 1833-4847, XP004533299, ISSN: 1359-6454.
Gaeumann M., et al.: "Single-Crystal Laser Deposition of Superalloys: Processing-Microstructure Maps", Acta Materialia, Elsevier, Oxford, GB, vol. 49, No. 6, Apr. 2, 2001, pp. 1051-1062, XP001018288, ISSN: 1359-6454.

* cited by examiner

ADDITIVE MANUFACTURING BASED MULTI-LAYER FABRICATION/REPAIR

BACKGROUND

The present disclosure relates to additive manufacturing and, more particularly, to a model driven scan strategy for commercial additive manufacturing machines that can be utilized to deposit non-weldable alloys.

Laser Powder Bed Fusion (LPBF) is an additive manufacturing technique in which a laser is utilized to sinter powdered material. The laser may be guided by a 3D model to bind the powdered material and grow a solid structure component.

Laser Powder Bed Fusion processes have been limited to component with equiaxed (EQ) microstructure. Post processing treatments can't change the morphology from EQ to single crystal (SX) or directionally solidified (DS). This restricts the application of LPBF to EQ components with lower creep life requirements. Gas turbine engine hot section components require significant creep life and hence, SX or DS morphology cannot be obtained using conventional scan methodology employed in commercial powder bed machines.

SUMMARY

A method of additively manufacturing according to one disclosed non-limiting embodiment of the present disclosure includes generating a thermal model driven scan map; and maintaining an active melt pool of an active melt pool scan pattern with respect to the thermal model driven scan map such that a depth of the active melt pool is greater than a thickness of an equiaxed transition (CET) region.

A further aspect of the present disclosure includes initiating formation of the active melt pool in a cast single crystal (SX) baseplate.

A further aspect of the present disclosure includes restricting a scan rotation to zero and unidirectional movement of an active melt pool scan pattern to assure columnar single crystal (SX) growth.

A further aspect of the present disclosure includes maintaining the active melt pool of the active melt pool scan pattern with a lesser power than a conventional melt pool of a conventional scan pattern.

A further aspect of the present disclosure includes arranging the active melt pool scan pattern with a closer line spacing and higher velocity than the conventional scan pattern.

A further aspect of the present disclosure includes utilizing the thermal model driven scan map to model residual stress.

A further aspect of the present disclosure includes utilizing the thermal model driven scan map to define a morphology.

A further aspect of the present disclosure includes that the morphology is between single crystal (SX) regions, a directionally solidified (DS) and an equiaxed (EQ) microstructure.

A further aspect of the present disclosure includes that the thermal model driven scan map identifies an equiaxed cap region, a single crystal (SX) region, and a columnar to equiaxed transition (CET) region.

A method of additively manufacturing according to one disclosed non-limiting embodiment of the present disclosure includes locating a cast single crystal (SX) baseplate in an additively manufacturing machine; initiating formation of an active melt pool in the cast single crystal (SX) baseplate via an active melt pool scan pattern; generating a thermal model driven scan map that identifies an equiaxed cap region, a single crystal (SX) region, and a columnar to equiaxed transition (CET) region; and maintaining the active melt pool with the active melt pool scan pattern in accords with the thermal model driven scan map such that a depth of the active melt pool is greater than a thickness of an equiaxed transition (CET) region.

A further aspect of the present disclosure includes maintaining the active melt pool of the active melt pool scan pattern with a lesser power than a conventional melt pool of a conventional scan pattern.

A further aspect of the present disclosure includes arranging the active melt pool scan pattern with a closer line spacing and higher velocity than the conventional scan pattern.

A further aspect of the present disclosure includes utilizing the thermal model driven scan map to model residual stress.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
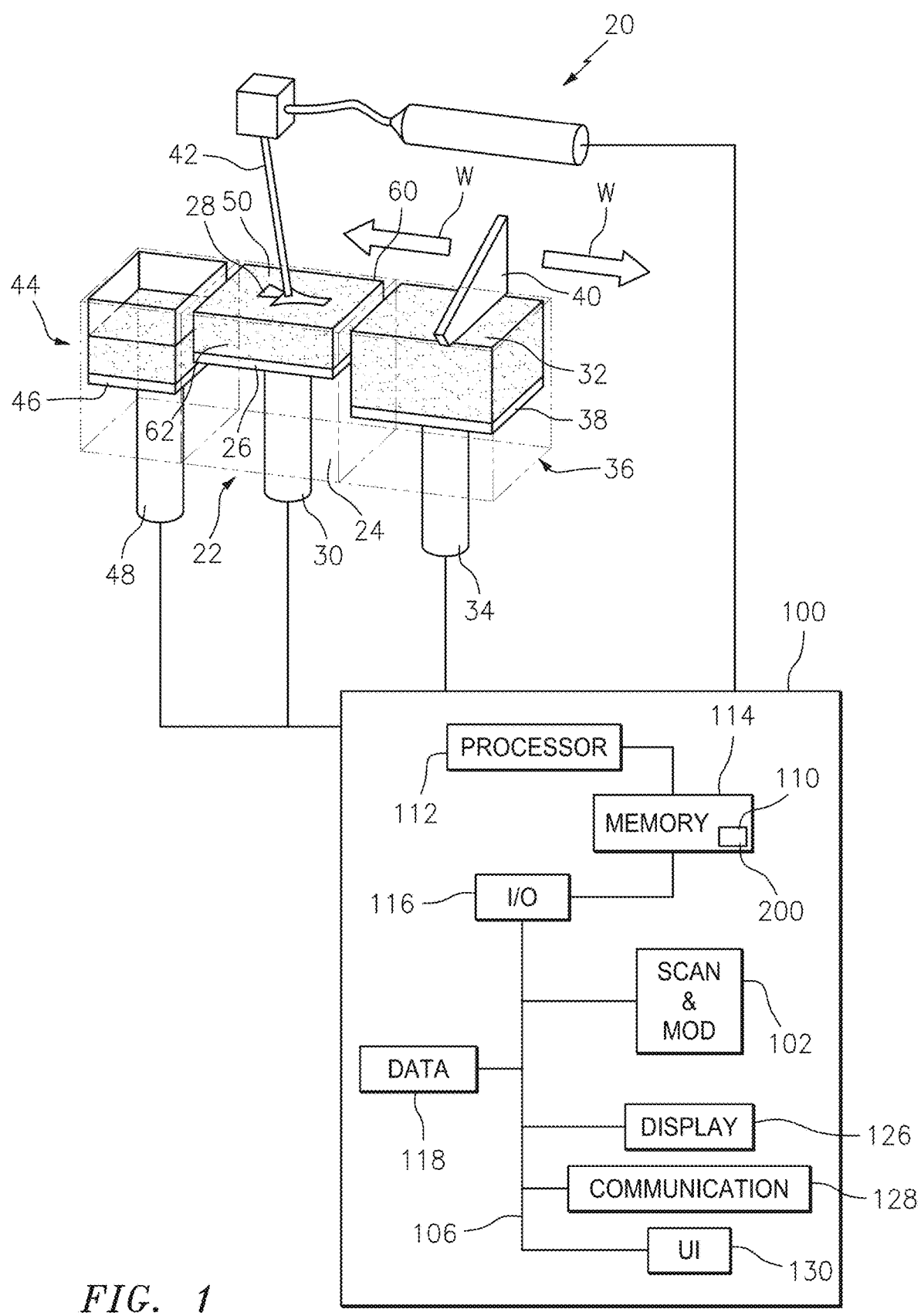
FIG. 1 is a schematic cross section of an additive manufacturing system.

FIG. 1 schematically illustrates an additive manufacturing system 20 that may have particular applicability to an additive manufacturing process for gas turbine engine hot section components 28 such as turbine blades, vanes, combustor components, augmentor components, etc. Although Laser Powder Bed Fusion (LPBF) is schematically illustrated it should be appreciated that other additive manufacturing processes such as selective laser melting (SLM) that also utilize a laser scan methodology will also benefit herefrom. The additive manufacturing process sequentially builds-up layers of atomized alloy and/or ceramic powder material. The initial applications of superalloy turbine blades and vanes were equiax (EQ) alloys (IN 718, IN 625) where grains are approximately of similar size and grain boundaries are randomly oriented. Next advancement came in the form of DS or directionally solidified alloys (CM 186 LC, CM 247 LC) that eliminated grain boundaries transvers to high stress loading axis, thus realizing significant gains in creep-rupture strength and low cycle fatigue life. In Single crystal (SX) alloy all grain boundaries are eliminated and consequently, the need for grain boundary strengthening elements, such as C, B, Hf and Zr. Since these elements are melting point depressants, the temperature capability of SX alloys was significantly improved. Single crystal alloys are used in the most demanding high stress/high temperature engine applications such as 1st stage turbine blades and vanes and combustor components where improved creep rupture, fatigue, oxidation and coating properties, are required. Alloys such as PWA 1484, CMSX-4, CMSX-10 have specific benefit for single crystal (SX) parts that operate in high temperature environments, such as, for example, environments typically encountered by aerospace and gas turbine engine hot section components.

The system 20 generally includes a chamber 22 that includes a process space 24 in which a build plate 26 upon which an additively manufactured component 28 is grown. This build plate 26 can be lowered by an actuator 30, so that the component 28 can be produced in the process space 24.

A stock of powder 32 is located in a powder dispenser 36 atop a dispenser plate 38 that can be raised by an actuator 34. The additively manufactured component 28 is grown on the build plate 26 as a recoater blade 40 sweeps across the surface thereof in a linear recoat direction as indicated by arrow W. The recoater blade 40 is moved over the stock of powder 32 in the dispenser 36, with the result that, after the lowering of the build plate 26, a further layer of powder is applied and leveled by the recoater blade 40 such that a layer of the component 28 may be formed by a laser beam 42. The recoater blade 40 then spreads excess powder 32 into a powder collector 44 atop a collector plate 46 that is correspondingly lowered by an actuator 48. The additively manufactured component 28 is grown on the build plate 26 and the recoater blade 40 sweeps across the surface thereof in a linear recoat direction as indicated by arrow W.

An inlet manifold 60 communicates an inert process gas 70 such as argon or nitrogen through the process space 24 over the build plate 26 to an outlet manifold 62. This inert process gas minimizes undesirable reactions of the melting bath of component material with gaseous constituents to discharge possible evaporation products of the component material through the outlet manifold 62. A feed gas may alternatively or additionally provided to facilitate formation of a layer with a composition different from that of the component material.

The control system 100 may include hardware, firmware, and/or software components that are configured to perform the functions disclosed herein, including the functions of the model driven scan subsystem 102. While not specifically shown, the control system 100 may include other computing devices (e.g., servers, mobile computing devices, etc.) and computer aided manufacturer (CAM) systems which may be in communication with each other and/or the control system 100 via a communication network 106 to perform one or more of the disclosed functions. The control system 100 may include at least one processor 112 (e.g., a controller, microprocessor, microcontroller, digital signal processor, etc.), memory 114, and an input/output (I/O) subsystem 116. The control system 100 may be embodied as any type of computing device e.g., a server, an enterprise computer system, a network of computers, a combination of computers and other electronic devices, or other electronic devices. Although not specifically shown, the I/O subsystem 116 typically includes, for example, an I/O controller, a memory controller, and one or more I/O ports. The processor 112 and the I/O subsystem 116 are communicatively coupled to the memory 114. The memory 114 may be embodied as any type of computer memory device (e.g., volatile memory such as various forms of random access memory).

The I/O subsystem 116 is communicatively coupled to a number of hardware, firmware, and/or software components, including a data storage device 118, a display 126, a communication subsystem 128, a user interface (UI) subsystem 130, the model driven scan subsystem 102, and the repair determination subsystem 104. The data storage device 118 may include one or more hard drives or other suitable persistent storage devices (e.g., flash memory, memory cards, memory sticks, and/or others).

The display 126 may be embodied as any type of digital display device, such as a liquid crystal display (LCD), and may include a touchscreen. The display 126 is configured or selected to be capable of displaying two- and/or three-dimensional graphics. The communication subsystem 128 may include one or more optical, wired, and/or wireless network interface subsystems, cards, adapters, or other devices, as may be needed pursuant to the specifications and/or design of the particular computing device. The user interface subsystem 130 may include one or more user input devices (e.g., the display 126, a microphone, a touchscreen, keyboard, virtual keypad, etc.) and one or more output devices (e.g., audio speakers, LEDs, additional displays, etc.) to facilitate manufacture of the component 28.

Figure 2:
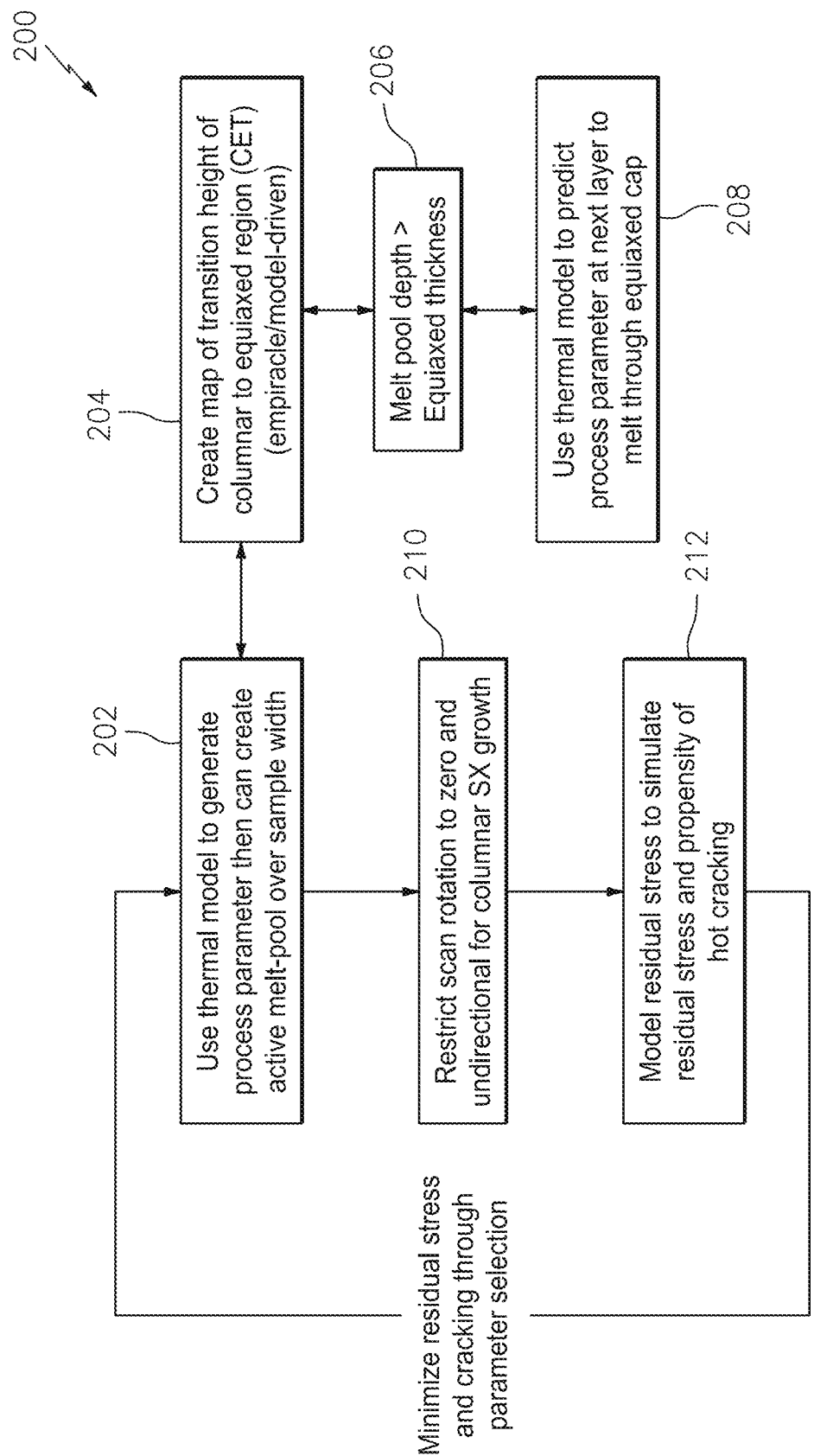
FIG. 2 is a block diagram representative of a method to actively control a scan methodology to fabricate/repair single crystal (SX) components.

With reference to FIG. 2, the control system 100 (FIG. 1) executes logic 110 representative of a method 200 to actively govern a thermal model driven scan map to fabricate/repair a single crystal (SX) component 28. The functions of the method 200 are disclosed in terms of functional block diagrams, and it should be appreciated that these functions may be enacted in either dedicated hardware circuitry or programmed software routines capable of execution in a microprocessor-based electronics control embodiment.

Figure 3:
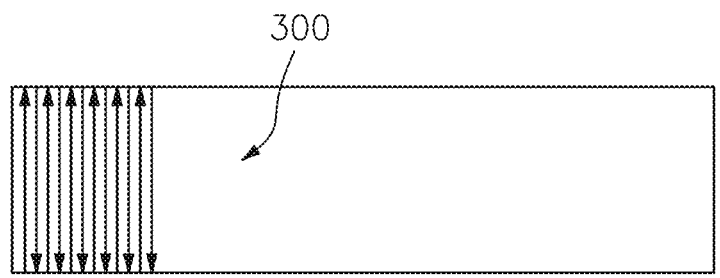
FIG. 3 is a schematic view of a thermal model driven scan map to fabricate/repair single crystal (SX) components.
Figure 4:
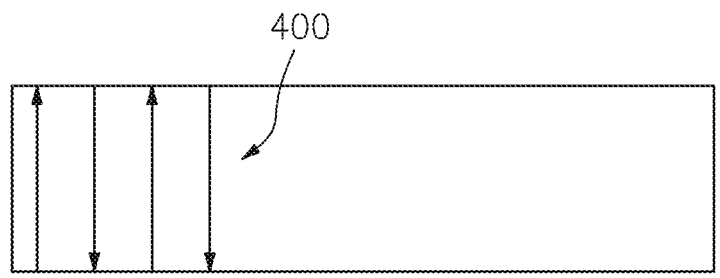
FIG. 4 is a schematic view of a conventional single bead scan strategy.
Figure 6:
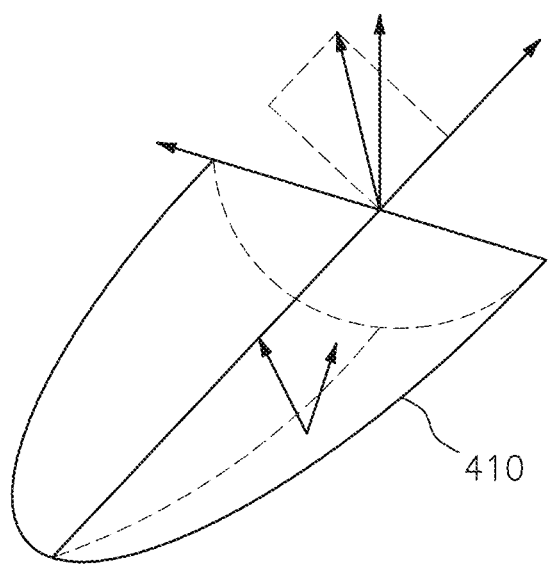
FIG. 6 is a schematic cross-sectional view of a conventional melt pool.
Figure 5:
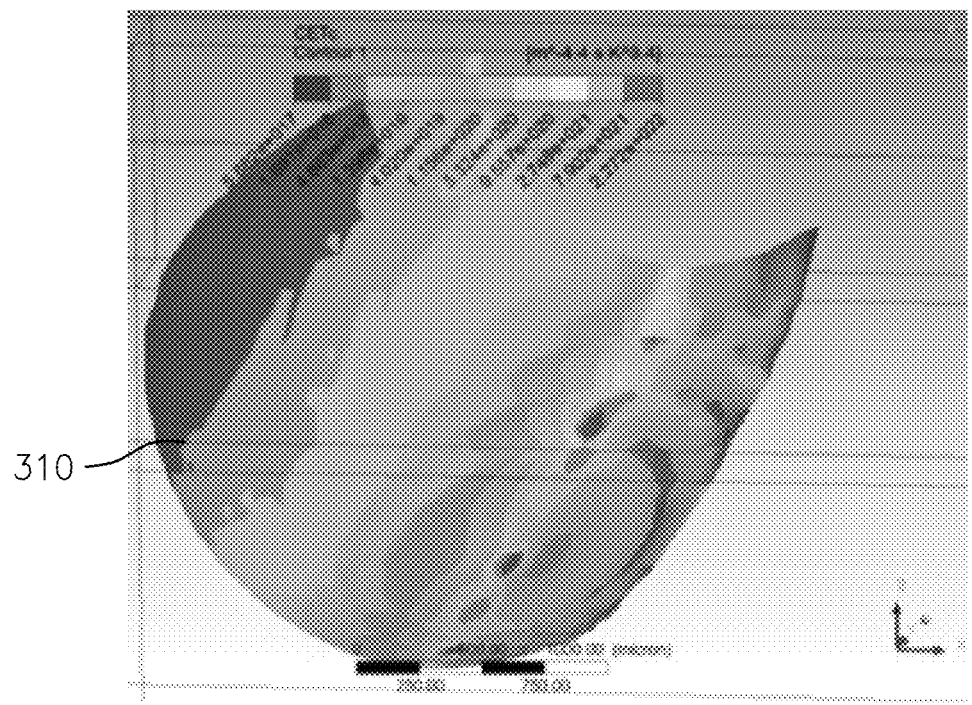
FIG. 5 is a schematic cross-sectional view of an active melt pool from the thermal model driven scan map to fabricate/repair single crystal (SX) components.
Figure 7:
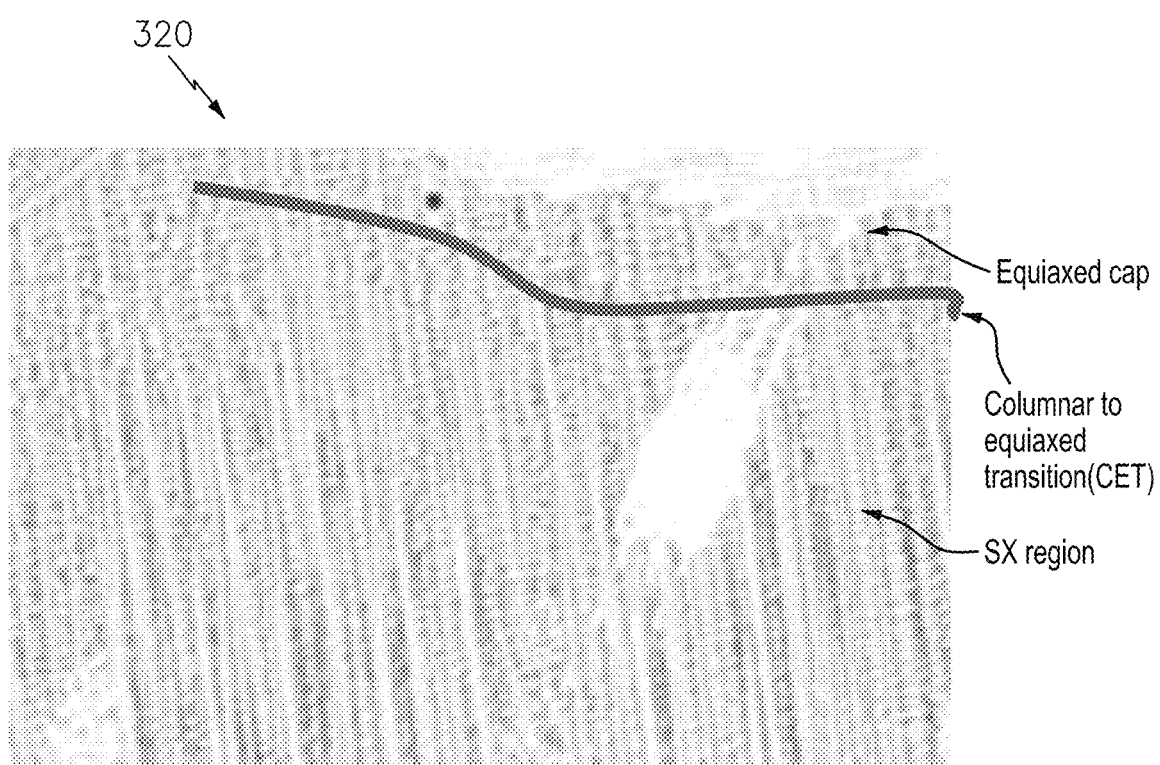
FIG. 7 is a schematic cross-sectional view of the active melt pool from the thermal model driven scan map that illustrates an equiaxed cap region, a SX region, and a columnar to equiaxed transition (CET) region.

Initially, the method 200 is initiated upon a cast single crystal (SX) baseplate (202). That is, the baseplate is the starting single crystal (SX) layer. A thermal model is used by the logic 100 to generate process parameter than form an active melt pool 310 over sample width. The active melt pool scan pattern 300 (FIG. 3) is maintained at a lesser power than a conventional scan pattern 400 (FIG. 4) but with a much closer line spacing and higher velocity. As an example, the active melt pool pattern often uses two to three times the scan velocity compared to machine default while maintaining the power within 80% of machine default The active melt pool scan pattern 300 is a pattern that essentially falls within the pattern utilized to manufacture the component. That is, the active melt pool scan pattern 300 is the pattern utilized while following the meta pattern that forms the component. The active melt pool scan pattern 300 generates an essentially flat active melt pool 310 (FIG. 5) as the line heat source moves in X-direction as compared to a conventional ellipsoidal melt pool 410 (FIGS. 6 and 7).

Figure 8:
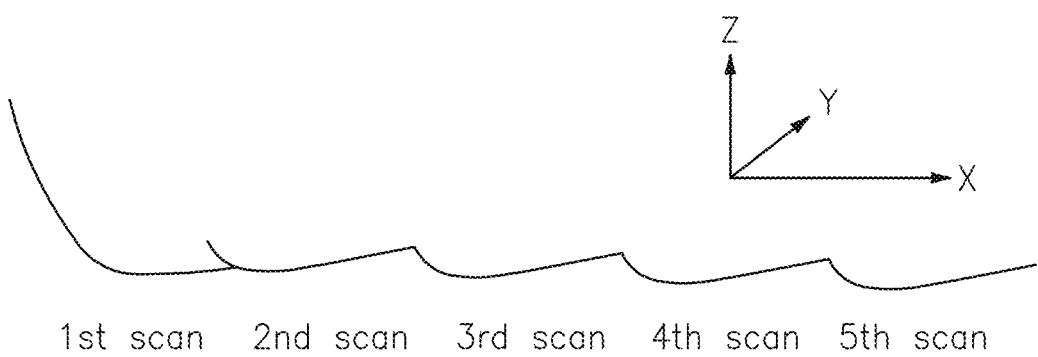
FIG. 8 is a schematic cross-sectional view of the active melt pool perpendicular to individual scan lines in y-direction.

A thermal model driven scan map 320 of the component 28 that identifies the transition height of columnar to equiaxed regions (CET) is then generated (204). The thermal model driven scan map 320 may be empirical/model-driven to assure that a depth of the melt is greater than an equiaxed thickness (206; FIG. 8). The thermal model driven scan map 320 is utilized to predict process parameters at the next layer of the melt pool 310 through equiaxed cap of the prior layer (208; FIG. 8).

The thermal model driven scan map 320 is utilized to restrict the scan rotation to zero and unidirectional movement to assure columnar single crystal (SX) growth (210). This essentially means that in (n+1)th layer, the individual scan lines that the laser travels are parallel and direction vectors are always in the same direction as in nth layer. In default scan pattern, these lines are rotated 670 across each layer while the direction is randomized The thermal model driven scan map 320 can additionally model residual stress to simulate and prevent the residual stress and propensity of hot cracking. The morphology (SX/DS/EQ) is thereby controlled as function of scan strategy. By changing the model driven scan strategy, hybrid parts may also be formed that include integral columnar single crystal (SX) and equiaxed (EQ) microstructures.

Figure 9:
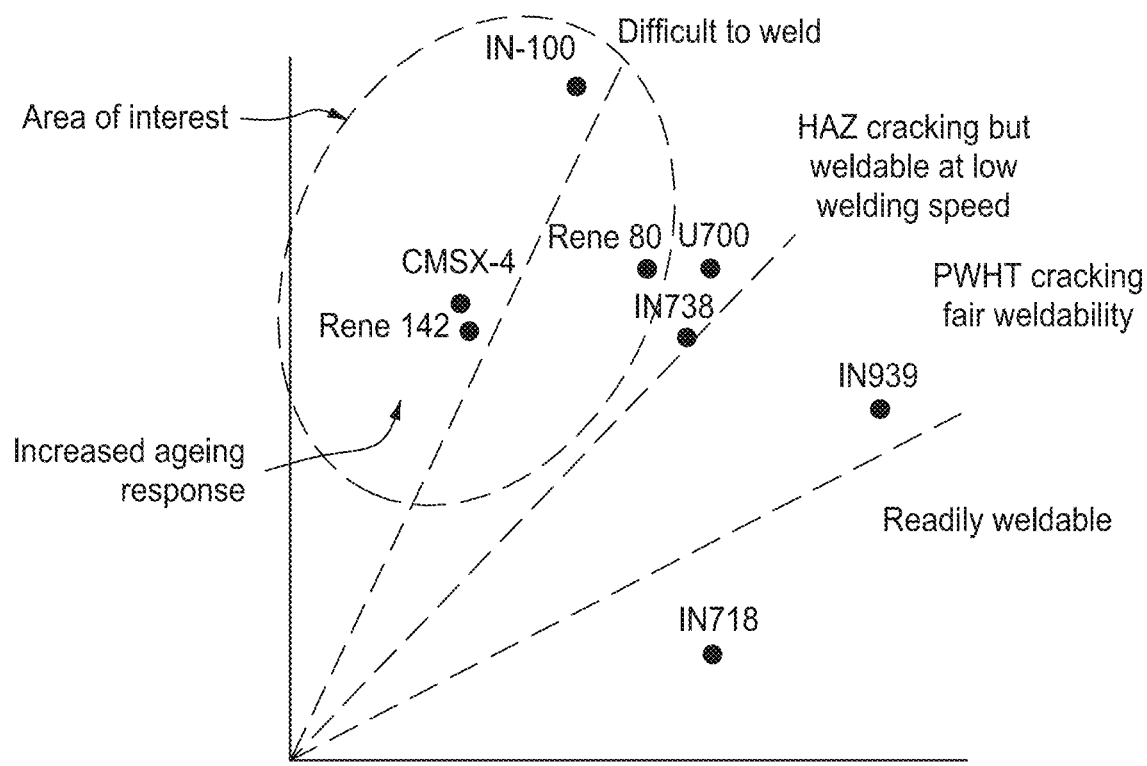
FIG. 9 is a graphical representation of an area of interest for weldable alloys which may be additively manufactured by the active melt pool from the thermal model driven scan map to fabricate/repair single crystal (SX) components

The method 200 implements a model driven scan strategy for commercial additive manufacturing machines that can be utilized to deposit non-weldable alloys (FIG. 9) for multiple layers to create the component 28. This provides an improved creep strength of additive manufacturing components by growing columnar single crystal (SX) or directionally solidified (DS). Morphology. This also reduces reduce residual stress and distortion of the component 28.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A method of additively manufacturing, comprising:
generating a thermal model driven scan map;
maintaining an active melt pool of an active melt pool scan pattern with respect to the thermal model driven scan map such that a depth of the active melt pool is greater than a thickness of a columnar to equiaxed transition (CET) region;
restricting a scan rotation to zero and unidirectional movement of the active melt pool scan pattern to assure columnar single crystal (SX) growth;
utilizing the thermal model driven scan map to model residual stress to simulate and prevent residual stress and a propensity of hot cracking; and
utilizing the thermal model driven scan map to define a morphology, wherein the morphology includes a directionally solidified (DS) microstructure; wherein the thermal model driven scan map identifies the columnar to equiaxed transition (CET) region.

2. The method as recited in claim 1, further comprising initiating formation of the active melt pool in a cast single crystal (SX) baseplate.

3. The method as recited in claim 1, further comprising maintaining the active melt pool of the active melt pool scan pattern with a lesser power than a conventional melt pool of a conventional scan pattern.

4. The method as recited in claim 3, further comprising arranging the active melt pool scan pattern with a closer line spacing and higher velocity than the conventional scan pattern.

5. A method of additively manufacturing, comprising:
locating a cast single crystal (SX) baseplate in an additively manufacturing machine;
initiating formation of an active melt pool in the cast single crystal (SX) baseplate via an active melt pool scan pattern;
generating a thermal model driven scan map that identifies an equiaxed cap region, a single crystal (SX) region, and a columnar to equiaxed transition (CET) region;
maintaining the active melt pool with the active melt pool scan pattern in accords with the thermal model driven scan map such that a depth of the active melt pool is greater than a thickness of a columnar to equiaxed transition (CET) region;
restricting a scan rotation to zero and unidirectional movement of the active melt pool scan pattern to assure columnar single crystal (SX) growth;
utilizing the thermal model driven scan map to model residual stress to simulate and prevent residual stress and a propensity of hot cracking; and
utilizing the thermal model driven scan map to define a morphology, wherein the morphology includes a directionally solidified (DS) microstructure.

6. The method as recited in claim 5, further comprising maintaining the active melt pool of the active melt pool scan pattern with a lesser power than a conventional melt pool of a conventional scan pattern.

7. The method as recited in claim 6, further comprising arranging the active melt pool scan pattern with a closer line spacing and higher velocity than the conventional scan pattern.

* * * * *